(12) United States Patent
Gupta

(10) Patent No.: US 11,768,389 B2
(45) Date of Patent: Sep. 26, 2023

(54) COMPACT POSITIONABLE CLIP ON MAGNIFIERS

(71) Applicant: DPG USA Inc, Schaumburg, IL (US)

(72) Inventor: Nikhil Gupta, Schaumburg, IL (US)

(73) Assignee: DPG USA INC., Schaumburg, IL (US)

( * ) Notice: Subject to any disclaimer, the term of this patent is extended or adjusted under 35 U.S.C. 154(b) by 399 days.

(21) Appl. No.: 17/021,006

(22) Filed: Sep. 15, 2020

(65) Prior Publication Data

US 2021/0080752 A1   Mar. 18, 2021

Related U.S. Application Data

(60) Provisional application No. 62/901,254, filed on Sep. 16, 2019.

(51) Int. Cl.
*G02C 7/08*   (2006.01)
*G02C 9/04*   (2006.01)

(52) U.S. Cl.
CPC ............... *G02C 7/088* (2013.01); *G02C 9/04* (2013.01)

(58) Field of Classification Search
CPC .................................. G02C 7/088; G02C 9/04
USPC ....................................................... 351/41, 57
See application file for complete search history.

(56) References Cited

U.S. PATENT DOCUMENTS

| | | | | |
|---|---|---|---|---|
| 3,531,188 A | * | 9/1970 | Bloch ...................... | G02C 9/04 351/59 |
| 5,469,229 A | * | 11/1995 | Greenbaum ............ | A61F 9/025 351/125 |
| 2012/0105740 A1 | * | 5/2012 | Jannard ..................... | G06F 3/16 351/158 |

* cited by examiner

*Primary Examiner* — Tuyen Tra
(74) *Attorney, Agent, or Firm* — Dunlap Bennett & Ludwig, PLLC; Anna L. Kinney

(57) ABSTRACT

An auxiliary magnifying system for use in connection with a pair of glasses, includes:
  a. a positionable mounting fixture, said positionable mounting fixture comprising:
     i. an elongated body having
     ii. a pair of engageable mounting wings thereupon,
  b. an axle retained therein about which said rotatable mounting wing may be rotated;
  c. a mount capable of retaining a positioning arm thereupon;
  d. a flexibly deformable arm, one end of which is capable of being retained in said mount on said elongated body;
  e. a bracket capable of being mounted on the other end of said flexibly deformable arm; and
  f. a lens mountable in said bracket.

13 Claims, 12 Drawing Sheets

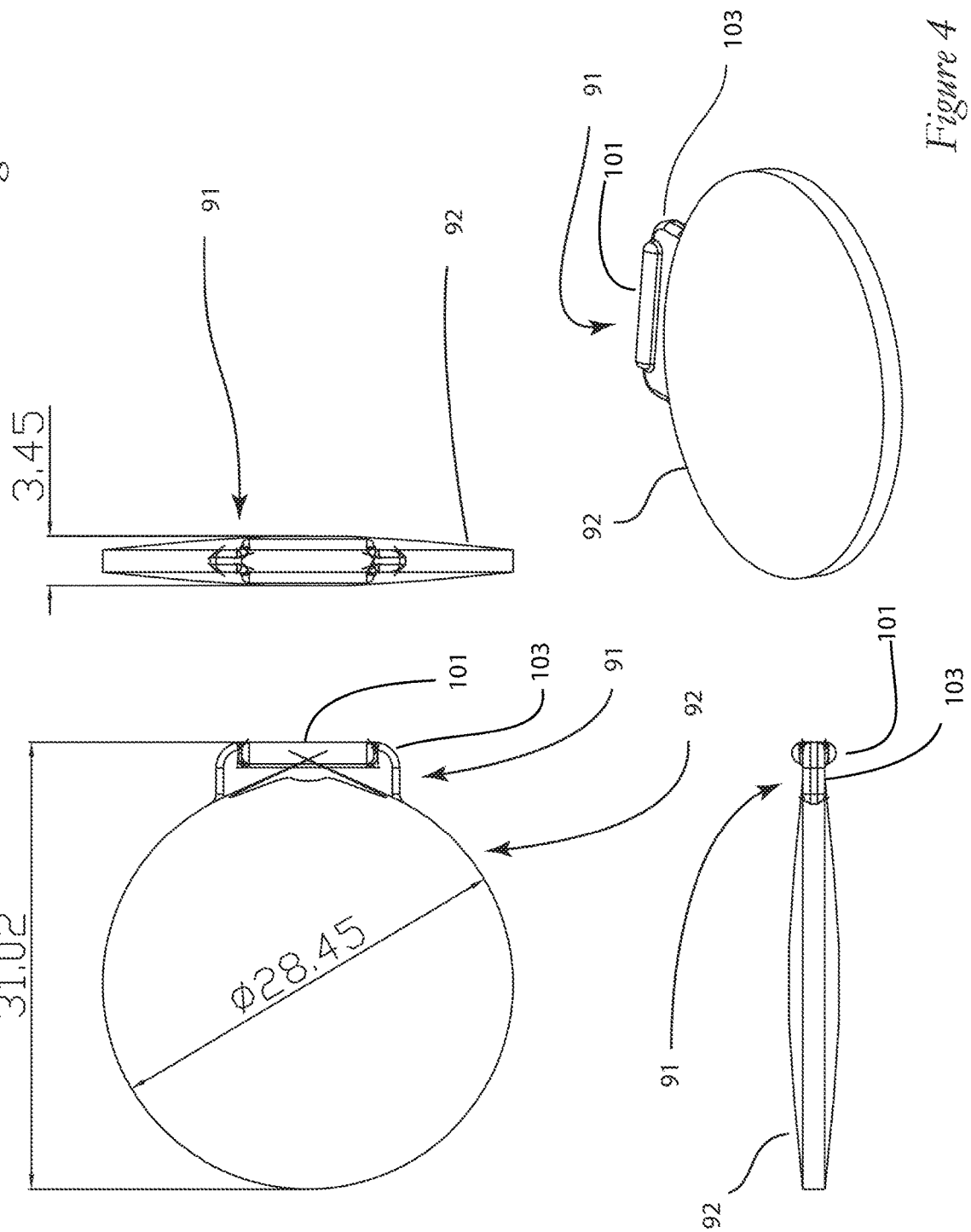

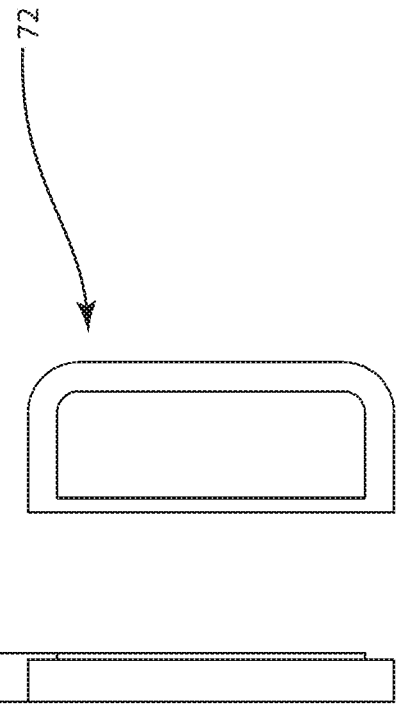
Figure 5
Figure 6
Figure 7
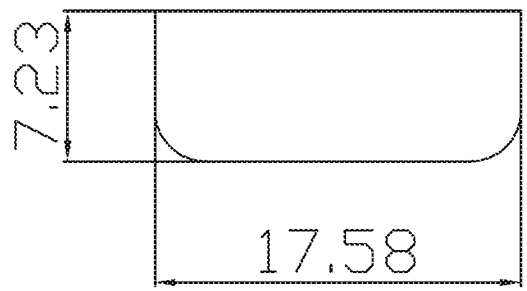
Figure 8
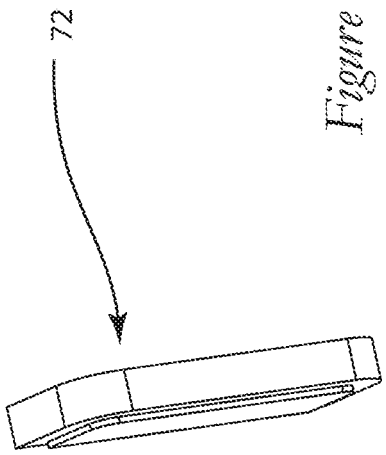
Figure 9

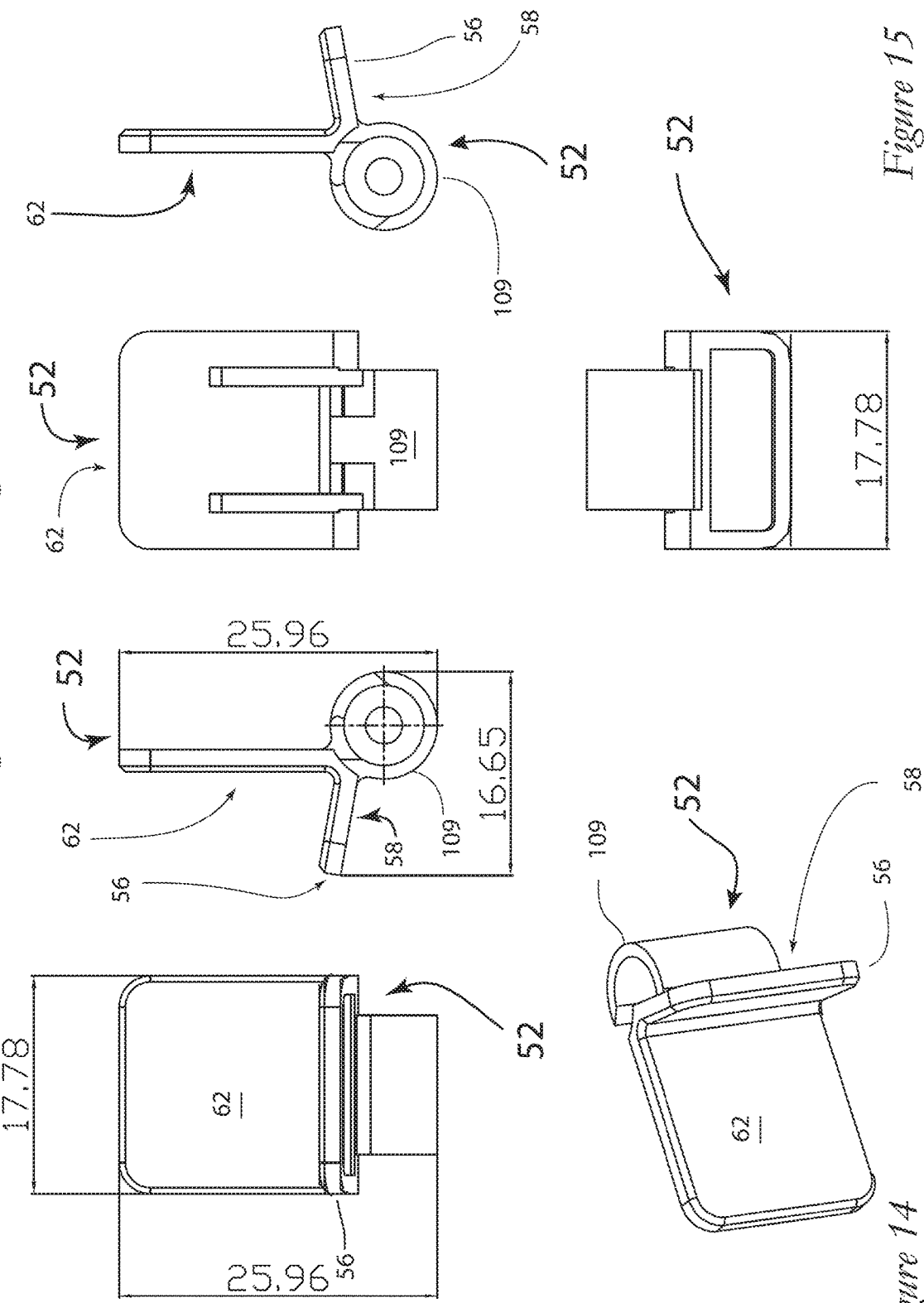

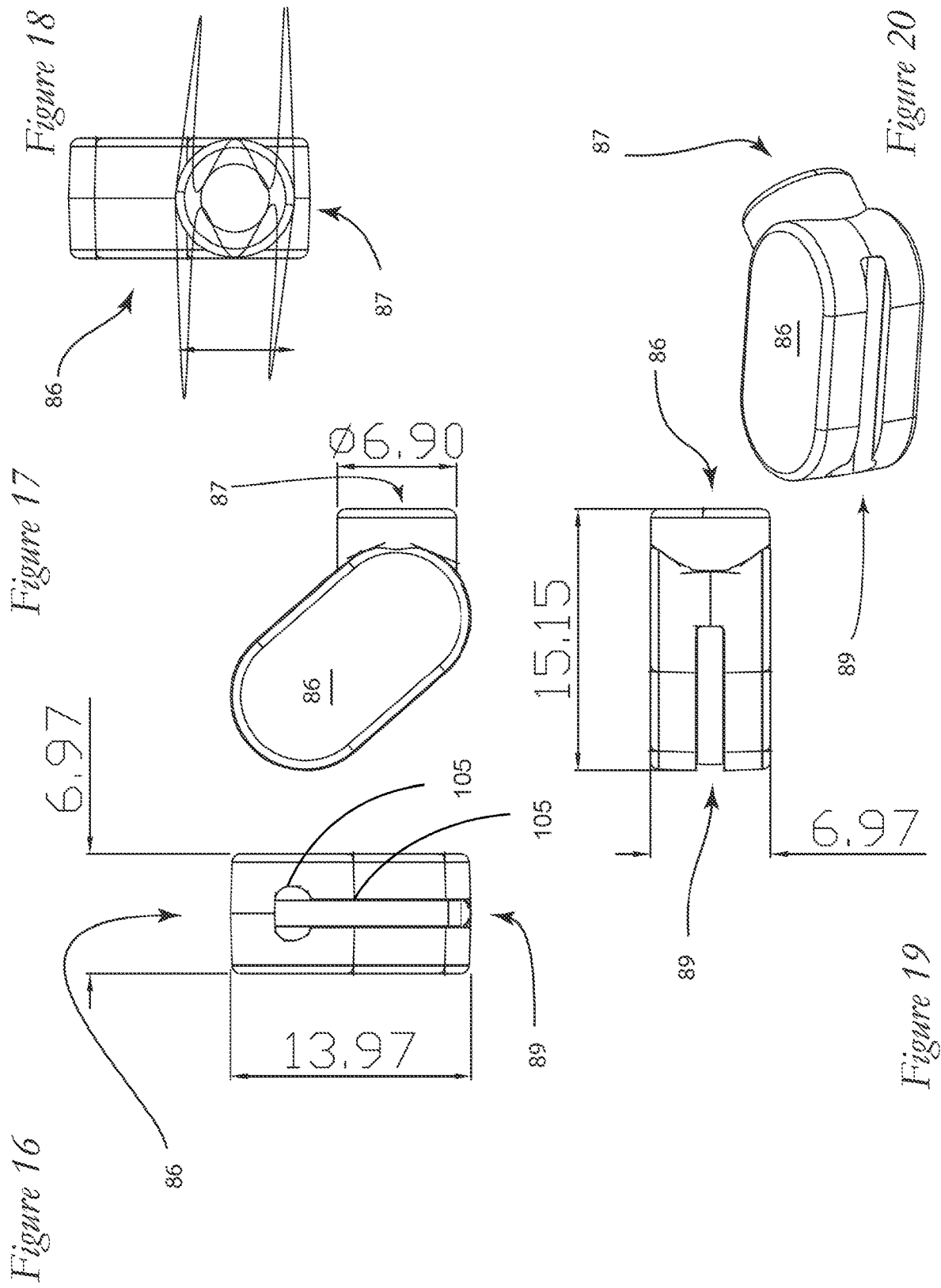

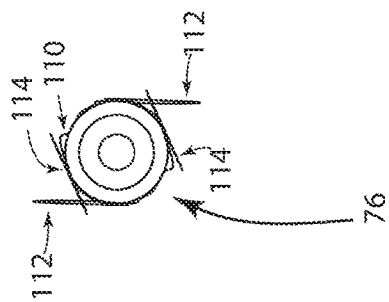
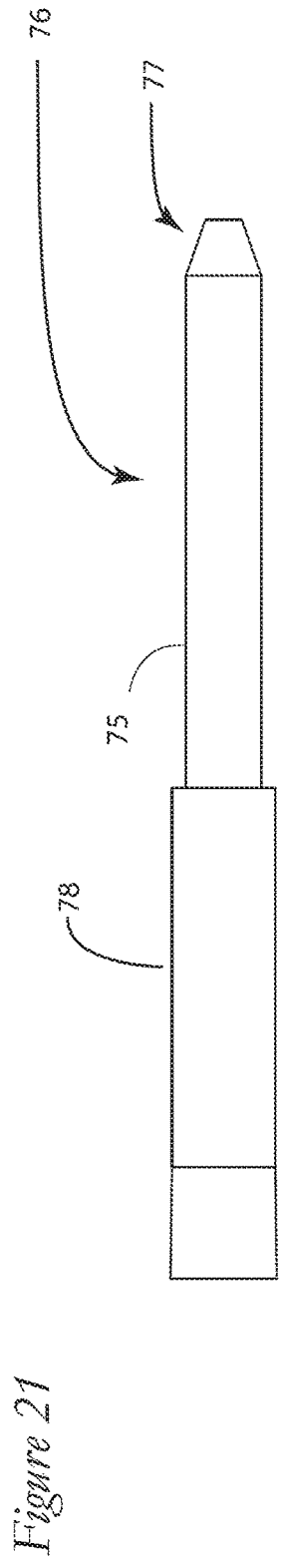
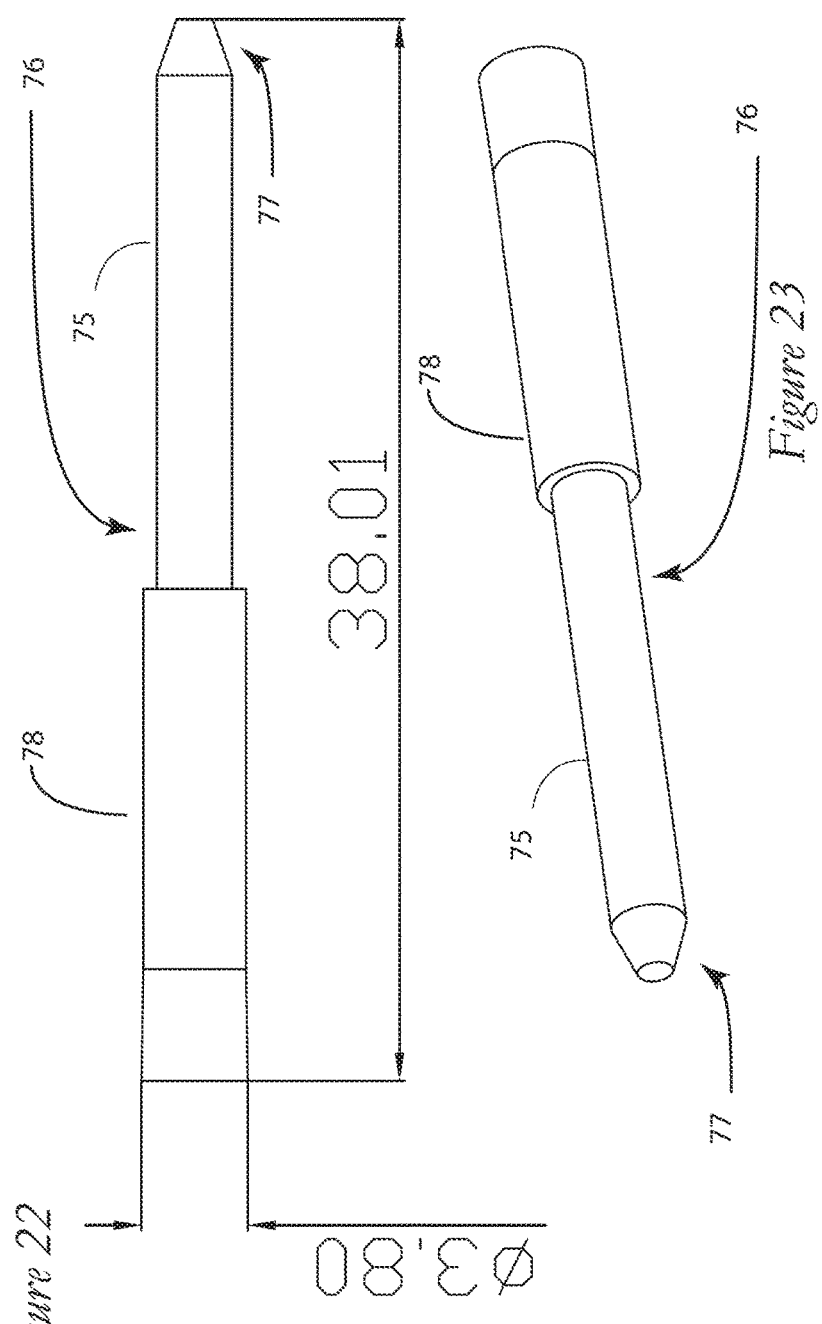

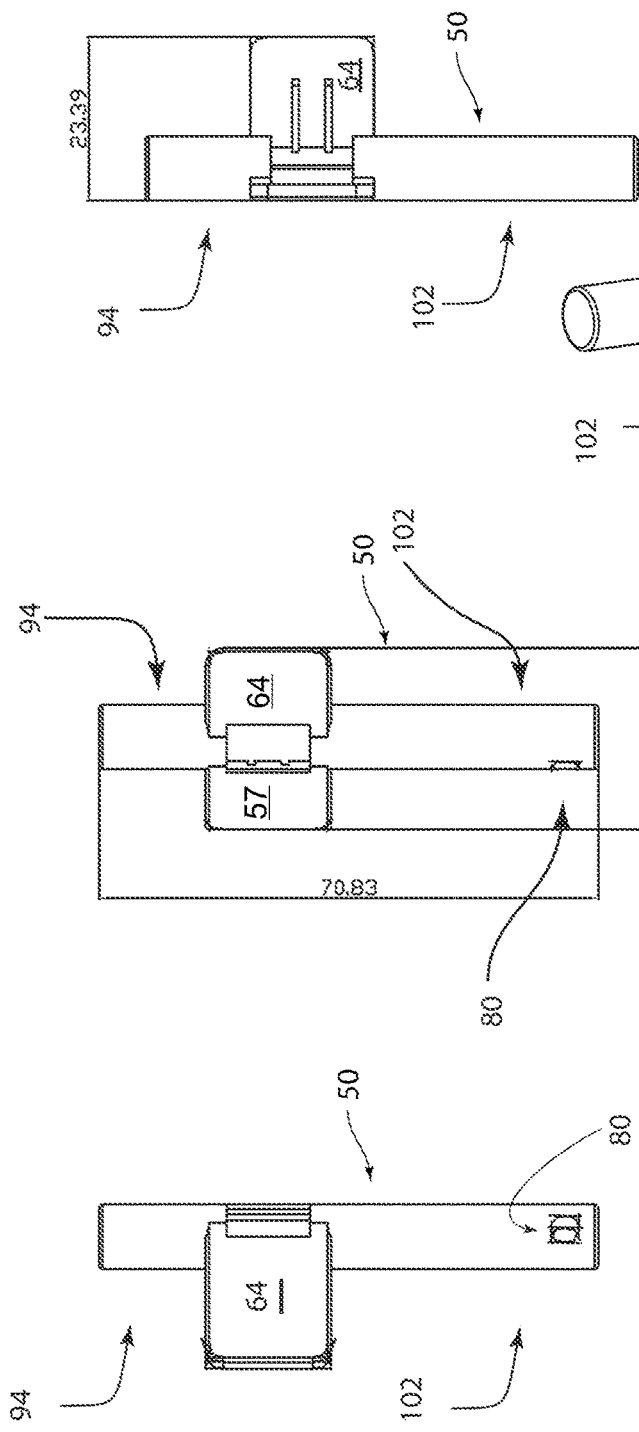

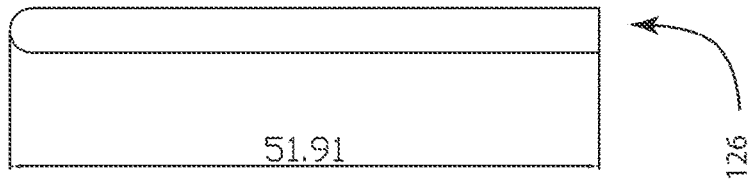
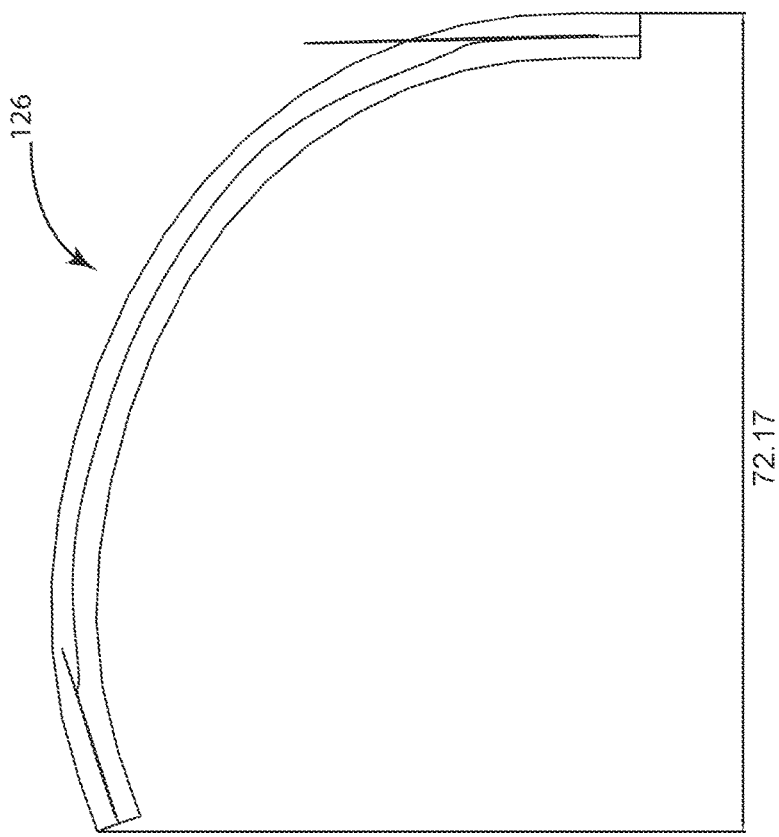
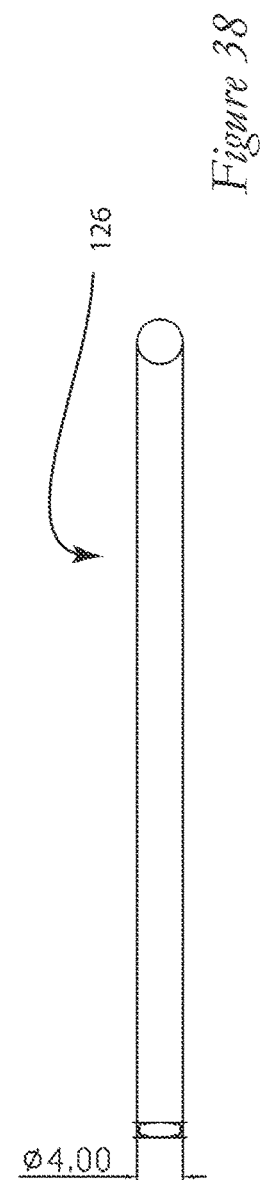
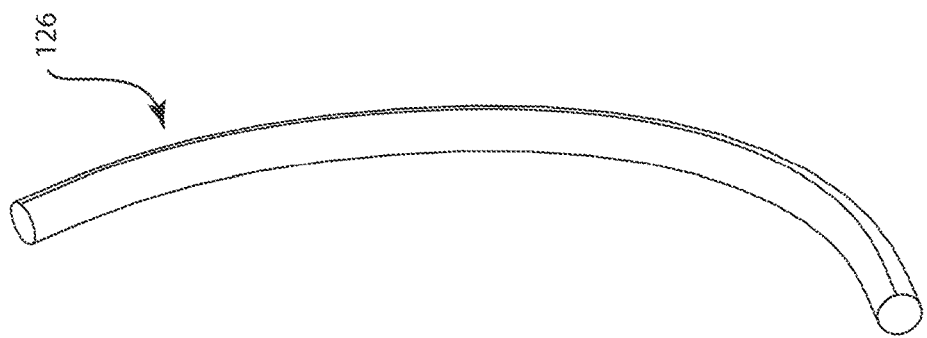

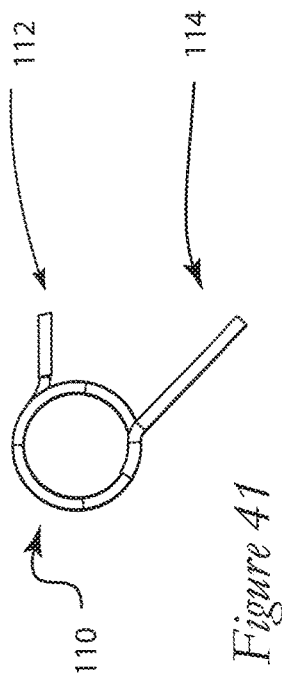
*Figure 39*
*Figure 40*
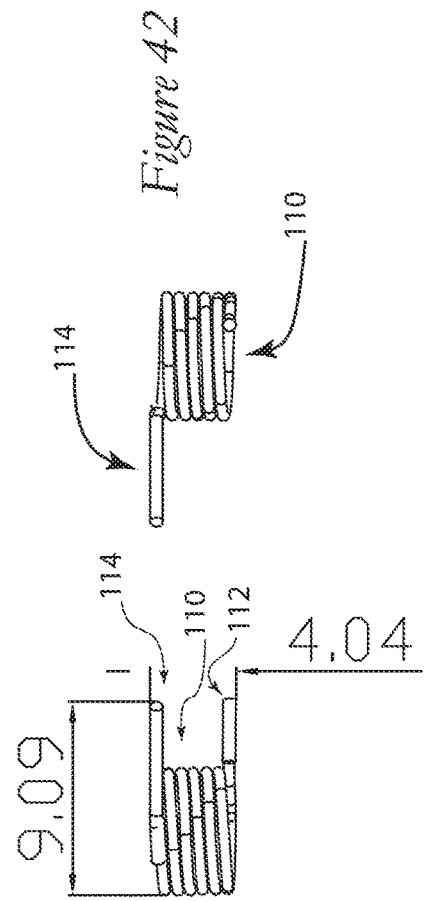
*Figure 41*
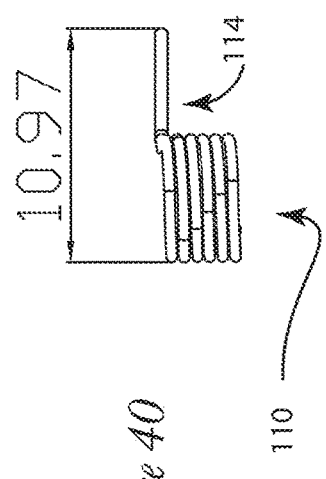
*Figure 43*
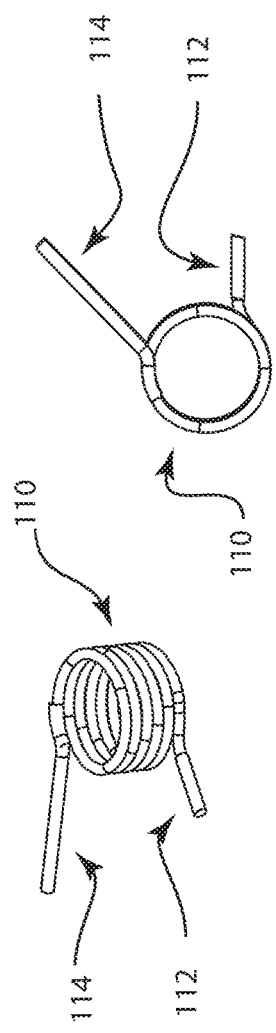
*Figure 42*
*Figure 44*

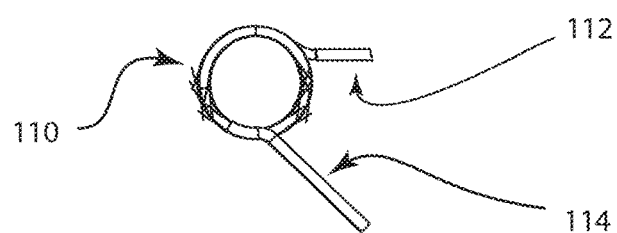
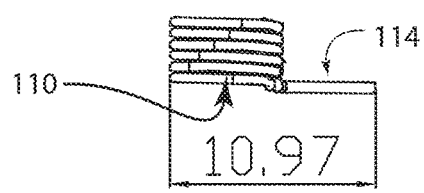
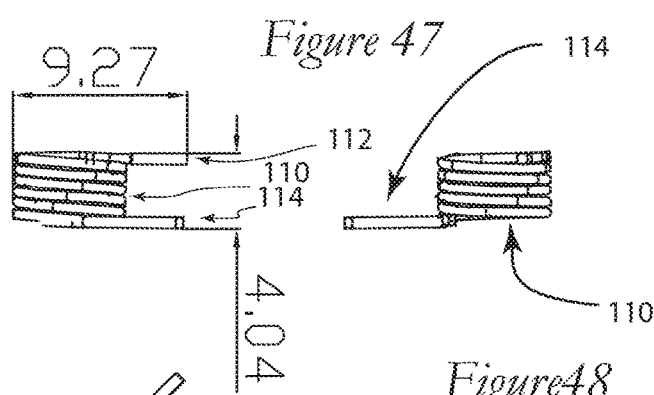
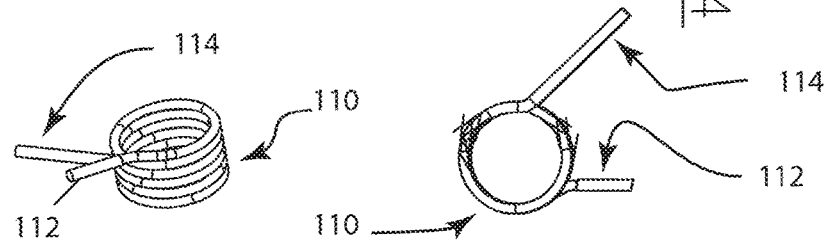
Figure 45
Figure 46
Figure 47
Figure 48
Figure 49
Figure 50

COMPACT POSITIONABLE CLIP ON MAGNIFIERS

This application claims the priority of provisional application Ser. No. 62/901,254 filed Sep. 16, 2019, which provisional application is incorporated by reference herein in its entirety.

For many hobbies, ordinary reading glasses are adequate for the majority of tasks but occasional intermittent tasks requires enhanced magnification. For example, in sewing most of the time, reading glasses will serve nicely but for threading a needle or cutting the fabric inside a button hole, more precision may be desired. However pulling out a second pair of reading glasses can be troublesome—where do you put the low—power pair while you are using the high-power pair and vice-versa and how much time is wasted switching between the two.

BRIEF SUMMARY OF THE INVENTION

This invention addresses those issues by providing: an auxiliary magnifying system for use in connection with a pair of glasses, comprising: a positionable mounting fixture, said positionable mounting fixture comprising: an elongated body having a pair of engageable mounting wings thereupon, each said engageable mounting wing having a clamping arm and an opening lever thereupon, said opening levers defining a "V", the bisector of said "V" being generally normal to the clamping surfaces of said engagement arms, wherein said clamping arm and said opening lever adjoin a central body with said clamping arms being urged into engagement with each other by a resilient member, at least one of said mounting wings being rotatable about an axis, said axis being generally collinear with the longitudinal axis of said elongated body, said clamping wings having engageable clamping surfaces, each with a resilient clamping pad thereupon, said clamping surfaces being urgable out of engagement by pressing together the portions of said opening levers defining said "V" against the action of said resilient member, an axle retained therein about which said rotatable mounting wing may be rotated; a mount capable of retaining a positioning arm thereupon; a flexibly deformable arm, one end of which is capable of being retained in said mount on said elongated body; a bracket capable of being mounted on the other end of said flexibly deformable arm; and a lens mountable in said bracket. In another embodiment, the bisector of said "V" is generally parallel to said clamping surfaces so that said elongated body may be disposed above the sidepieces of a pair of spectacles on which it may be mounted. When the bisector of the "V" is generally normal to the clamping surfaces, the elongated body may project laterally outward therefrom.

BRIEF DESCRIPTION OF THE DRAWINGS

FIG. 1 is a plan view of an auxiliary lens of the present invention.

FIG. 2 is a side elevational view of an auxiliary lens of the present invention.

FIG. 3 is a front elevational view of an auxiliary lens of the present invention.

FIG. 4 is an isometric perspective view of an auxiliary lens of the present invention.

FIG. 5 is a plan view of the lower surface of a resilient clamping pad.

FIG. 6 is a side elevational view of a resilient clamping pad.

FIG. 7 is a plan view of the upper surface of a resilient clamping pad.

FIG. 8 is a front elevational view of a resilient clamping pad.

FIG. 9 is an isometric perspective view of a resilient clamping pad.

FIG. 10 is a plan view of the outer surface of a rotatable engagement wing.

FIG. 11 is a left elevational view of a rotatable engagement wing.

FIG. 12 is a plan view of the inner surface of a rotatable engagement wing.

FIG. 13 is a right elevational view of a rotatable engagement wing.

FIG. 14 is an isometric perspective view of a rotatable engagement wing.

FIG. 15 is a front elevational view of a rotatable engagement wing.

FIG. 16 is a left elevation of a mounting bracket.

FIG. 17 is a plan view of a mounting bracket.

FIG. 18 is a right elevation of a mounting bracket.

FIG. 19 is lower elevation of a mounting bracket.

FIG. 20 is an isometric perspective view of a mounting bracket.

FIG. 21 is a front elevation of an axle.

FIG. 22 is a plan view of an axle.

FIG. 23 is an isometric perspective view of an axle.

FIG. 24 is an end view of an axle.

FIG. 25 is a left elevation of the elongated body and fixed mounting wings.

FIG. 26 is a plan view of the elongated body and fixed mounting wings.

FIG. 27 is a right elevation of the elongated body and fixed mounting wings.

FIG. 28 is an end view of the elongated body and fixed mounting wings

FIG. 29 is an isometric perspective view of the elongated body and fixed mounting wings.

FIG. 35 is an isometric perspective view of a flexible metallic coiled gooseneck.

FIG. 36 is a plan view of a flexible metallic coiled gooseneck.

FIG. 37 is an end view of a flexible metallic coiled gooseneck.

FIG. 38 is a bottom view of a flexible metallic coiled gooseneck.

FIG. 39 is an upper plan view of a coiled helical spring.

FIG. 40 is a left side elevation of a coiled helical spring.

FIG. 41 is a front elevation of a coiled helical spring.

FIG. 42 is a right side elevation of a coiled helical spring.

FIG. 43 is an isometric perspective view of a coiled helical spring.

FIG. 44 is a lower plan view of a coiled helical spring.

FIG. 45 is an upper plan view of a coiled helical spring.

FIG. 46 is a left side elevation of a coiled helical spring.

FIG. 47 is a front elevation of a coiled helical spring.

FIG. 48 is front elevation of a coiled helical spring.

FIG. 49 is an isometric perspective view of a coiled helical spring.

FIG. 50 is a lower plan view of a coiled helical spring.

DESCRIPTION OF THE PREFERRED EMBODIMENT

Figures 30, 31, 32, 33, 34:
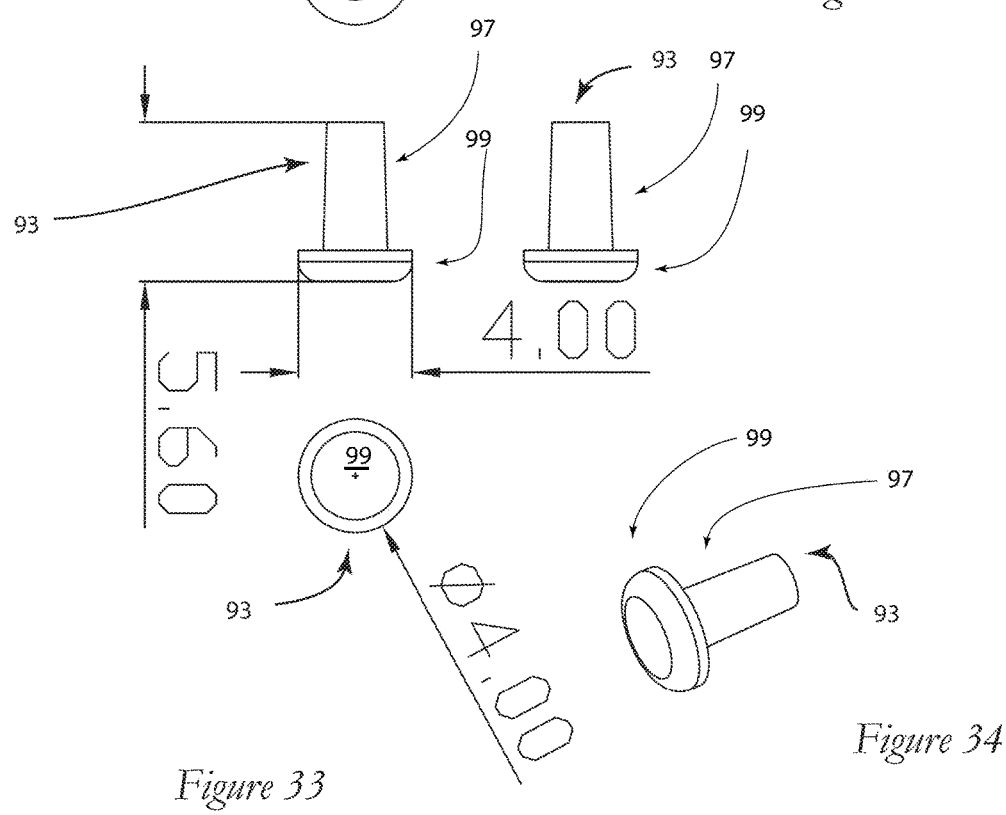
FIG. 30 is a right side elevation of a mounting pin.
FIG. 31 is a top view of a mounting pin.
FIG. 32 is a left side elevation of a mounting pin.
FIG. 33 is a bottom view of a mounting pin.
FIG. 34 is an isometric perspective view of a mounting pin.

The positionable clip on magnifier of the present invention comprises: an elongated body 50 having through bore 96 in first elongated portion 94 with axle 76 having shaft 75 with conical point 77 and retention portion 78 being insertable therein. Mounting wings 54 comprising clamping arms 57 and opening lever 64 are preferably fixed between first body portion 94 and second body portion 102 of elongated body 50, leaving rotation space 95 therebetween into which engageable floating mounting wing 52 may be inserted. Clamping arms 56, 57 are urged together by coil springs 110 having peripherally extending arms 112, 114 projecting therefrom at each end urging opening levers 62, 64 apart, so that in the rest configuration, clamping surfaces 58, 60 are urged tightly together by the force of coil springs 110. In a forwardly located position, mount 80 for proximal end of positioning arm 126 is bored into second elongated body portion 102. Preferably, positioning arm 126 is a flexible metallic coiled gooseneck similar to that sometimes used in making desk lamps, but reduced in scale, enabling the user to easily position lens 92 mounted on the distal end of positioning arm 126 in front of a pair of glasses when needed then pivot lens 92 out of the way when no longer needed. Gooseneck arms are typically formed of a pair of flexible metal strip0s in a double helix having a hollow therein. Such arms are prone to unwind. We can forestall such unwinding by insertion of retention pin 93 having tapered body 97 and chamfered head 99 formed therein into the hollow of flexible positioning arm 126. Preferably the difference between the base diameter of tapered body 97 and the overall diameter of chamfered head 99 is generally equivalent to twice the thickness of the wall portions positioning arm 126 while the overall diameter of chamfered head 99 is substantially equal to the diameter of mount 80 so that the wall of flexible positioning arm is confined between the tapered body 97 and mount 80 when retention pin 93 is inserted into flexible positioning arm 126 and thereafter inserted into mount 80, flexible positioning arm 126 is forestalled from unwinding. Preferably lens 92 has mounting tab 91 with a bulge 101 on neck 103 formed in its periphery which is adapted to be retained in T-slot 89 on mounting bracket 86 having mounting bore 87 formed thereupon to receive and retain the distal end of positioning arm 126.

Figure 51:
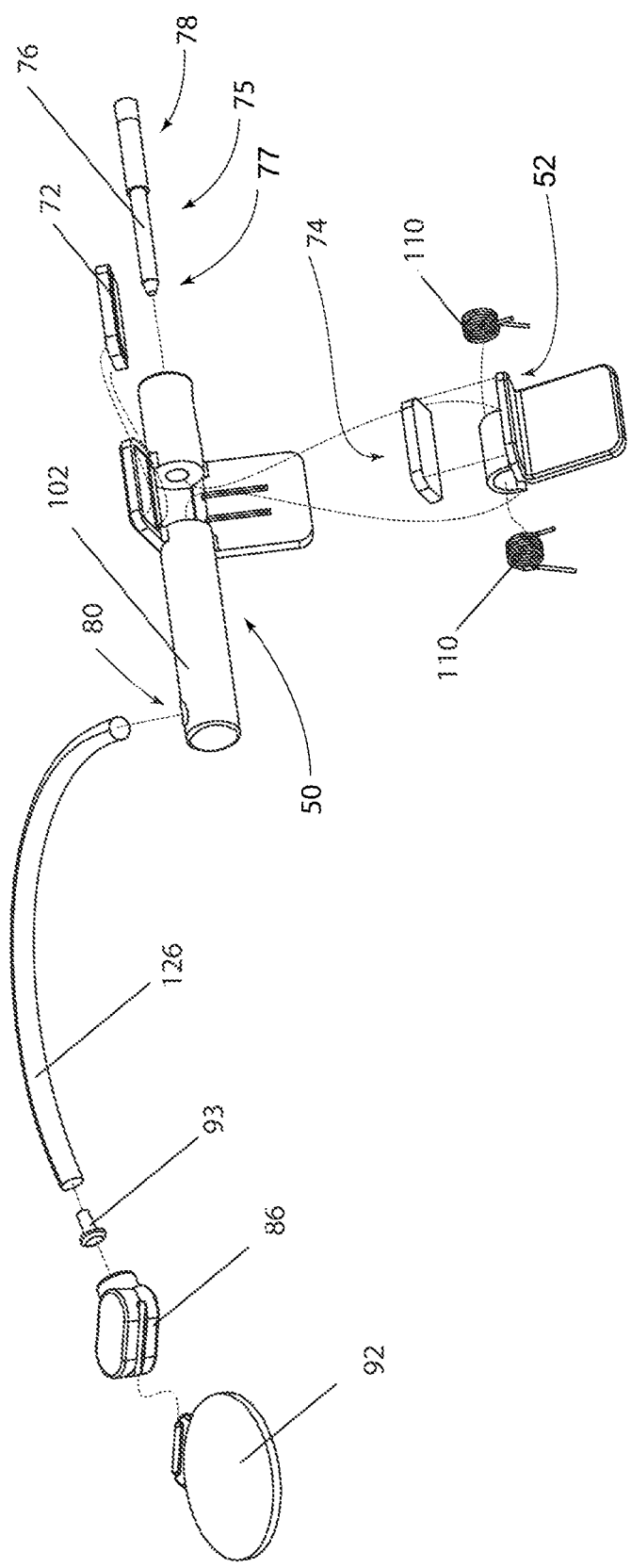
FIG. 51 is an exploded view of a compact positionable magnifier.
Figure 52:
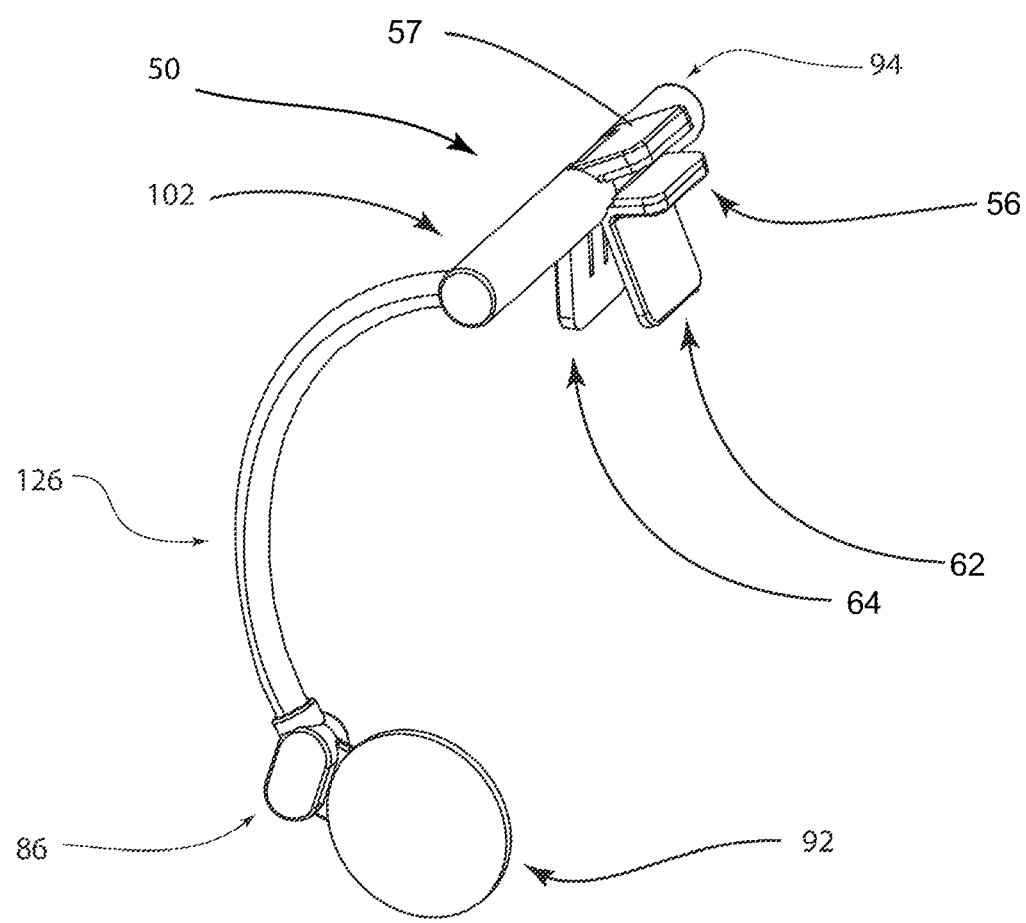
FIG. 52 is an assembled view of a compact positionable magnifier.

FIGS. 1-4 illustrate details of lens 92 for use in the present invention with mounting tab 91 along with bulge 101 on neck 103 formed on the periphery thereof. FIGS. 5-9 illustrate the configuration of the resilient clamping pads 72, 74 which engage the side pieces of a pair of eyeglasses that might be used with the present invention. FIGS. 10-15 illustrate floating wing 52 having perforate central body portion 109 with clamping arm 56 and opening lever 64 projecting therefrom. The length and diameter of perforate central body portion 109 is selected so that it may be inserted into rotation space 95 (See FIGS. 25-29) between first body portion 94 and second body portion 102 with axle 76 projecting therethrough. Preferably room is left in rotation space 95 for coil springs 110 so that outwardly projecting legs 112, 114 can urge opening levers 62, 64 away from each other while urging clamping arms 56, 57 together so that the sideframe of a pair of glasses can be clamped and removably retained between clamping surfaces 58, 60 which preferably have resilient clamping pads 72, 74 affixed thereto to ensure that the sideframe is reliably trapped therebetween. FIGS. 16-20 illustrate bracket 86 having T-slot 89 and mounting port 87 formed therein. T-Slot 89 is configured to receive and retain mounting tab 91 of lens 92 with bulge 101 fitting in head 105 of T-slot with neck 103 passing through stem 105 of T-slot 89 while mounting port 87 is configured to accept and retain distal end of flexible positioning arm 126, which is preferably capped with retention pin 93 having tapered body 97 and chamfered head 99 formed therein as this prevents the flexible positioning arm from unwinding, FIGS. 21-24 illustrate axle 76 having cylindrical shaft 75 about which perforate central body portion of floating wing 52 rotates while retention portion 78 is ensconced in first body portion 94 with conical tip 77 protruding into second body portion 102. FIG. 24 illustrates coil springs 110 disposed around axle 76 with prongs 112, 114 projecting therefrom. FIGS. 25-29 illustrate the fixed wing 54 with end portions 102 and 94 joined thereto leaving rotation space 95 therebetween. End portion 94 has throughbore 96 extending therethrough while end portion 102 need only be drilled out enough to accept conical tip of 77 of axle 76. FIGS. 30-34 illustrate retainer 93 having used to secure gooseneck 126 to bracket 86. FIGS. 35-38 illustrate a flexible positioning arm 126 which preferably takes the form of a flexible metallic coiled gooseneck to aid in easy positioning of lens 92. FIGS. 39-50 illustrate coiled springs 110 having prongs 112, 114 projecting outwardly therefrom. FIG. 51 is an exploded isometric perspective illustrating assembly of the clip-on compact flexible clip-on magnifier of the present invention. FIG. 52 is an isometric perspective illustrating an assembled clip-on compact flexible clip-on magnifier of the present invention. Where dimensions are indicated in the drawings, they represent the dimensions of the most preferred embodiment with the units being in millimeters.

As my invention, I claim:

1. An auxiliary magnifying system for use in connection with a pair of glasses, comprising:
   a) a positionable mounting fixture, said positionable mounting fixture comprising:
      i) an elongated body having
      ii) a pair of engageable mounting wings thereupon, each said engageable mounting wing having a clamping arm and an opening lever thereupon, said opening levers defining a "V", the bisector of said "V" being generally normal to the clamping surfaces of said clamping arms, wherein said clamping arm and said opening lever of each wing adjoin a central body with said clamping arms being urged into engagement with each other by a resilient member, at least one of said mounting wings being rotatable about an axis, said axis being generally collinear with the longitudinal axis of said elongated body, said clamping arms having engageable clamping surfaces, each with a resilient clamping pad thereupon, said clamping surfaces being urgable out of engagement by pressing together the portions of said opening levers defining said "V" against the action of said resilient member,
   b) an axle retained therein about which said rotatable one of said mounting wings is rotatable;
   c) a mount on said elongated body;
   d) a flexibly deformable arm, one end of which is capable of being retained in said mount on said elongated body;

e) a bracket capable of being mounted on the other end of said flexibly deformable arm; and f) a lens mountable in said bracket.

2. The auxiliary magnification system of claim 1, wherein: said elongated body comprises:

a) a first body portion having a bore defined therein;

b) a second body portion having a bore defined therein;

c) said first body portion being joined to one end of one of said opening levers and one end of one of said clamping arms, leaving a rotation space between said body portions into which said rotatable one of said mounting wings is insertable, said axle extending from said first body portion through said rotatable one of said mounting wings and into said second body portion; and said bracket having a T-Slot formed therein, said lens having a mounting tab with a neck having a bulge formed at the terminus of said neck, said bulge being mateably retainable in said T-slot.

3. The auxiliary magnification system of claim 2, wherein said resilient member is a coiled spring having an outwardly extending leg defined at each end thereof, said axle passing through the coil of said coiled spring, one leg thereof pressing against one of said opening levers, the other leg of said coiled spring bearing against the other of said opening levers, said legs being configured to urge said opening levers away from each other.

4. The auxiliary magnification system of claim 3, wherein another resilient member is provided, said other resilient member being another coiled spring having an outwardly extending leg defined at each end thereof, said axle passing through the coil of said other coiled spring, one leg of said other coiled spring pressing against one of said opening levers, the other leg of said other coiled spring bearing against the other of said opening levers, said legs being configured to urge said opening levers away from each other.

5. The auxiliary magnification system of claim 4, wherein said flexibly deformable arm comprises a hollow flexible metallic gooseneck coil, which has a retaining plug having a tapered body and a chamfered head formed therein, said tapered body being mounted in the hollow in said gooseneck and said chamfered head being retained in said mount on said bracket.

6. The auxiliary magnification system of claim 5, wherein said clamping arms are adapted to engage sidepieces of a pair of spectacles, holding said first and second body portions projecting laterally outward therefrom.

7. An auxiliary magnifying system for use in connection with a pair of glasses, comprising:

a) a positionable mounting fixture, said positionable mounting fixture comprising:

i) an elongated body having ii) a pair of engageable mounting wings thereupon, each said engageable mounting wing having a clamping arm and an opening lever thereupon, said opening levers defining a "V", the bisector of said "V" being generally parallel to the clamping surfaces of said clamping arms, wherein said clamping arm and said opening lever of each wing adjoin a central body with said clamping arms being urged into engagement with each other by a resilient member, at least one of said mounting wings being rotatable about an axis, said axis being generally collinear with the longitudinal axis of said elongated body, said clamping arms having engageable clamping surfaces, each with a resilient clamping pad thereupon, said clamping surfaces being urgable out of engagement by pressing together the portions of said opening levers defining said "V" against the action of said resilient member, b) an axle retained therein about which said rotatable one of said mounting wings is rotatable;

c) a mount on said elongated body;

d) a flexibly deformable arm, one end of which is capable of being retained in said mount on said elongated body;

e) a bracket capable of being mounted on the other end of said flexibly deformable arm; and f) a lens mountable in said bracket.

8. The auxiliary magnification system of claim 7, wherein: said elongated body comprises:

a) a first body portion having a bore defined therein;

b) a second body potion having a bore defined therein;

c) said first body portion being joined to one end of one of said opening levers and one end of one of said clamping arms, leaving a rotation space between said body portions into which said rotatable one of said mounting wings is insertable, said axle extending from said first body portion through said rotatable one of said mounting wings and into said second body portion.

9. The auxiliary magnification system of claim 8, wherein said resilient member is a coiled spring having an outwardly extending leg defined at each end thereof, said axle passing through the coil of said coiled spring, one leg of said coiled spring pressing against one of said opening levers, the other leg of said coiled spring bearing against the other of said opening levers, said legs being configured to urge said opening levers away from each other.

10. The auxiliary magnification system of claim 9, wherein another resilient member is provided, said other resilient member being another coiled spring having an outwardly extending leg defined at each end thereof, said axle passing through the coil of said other coiled spring, one leg of said other coiled spring pressing against one of said opening levers, the other leg of said other coiled spring bearing against the other of said opening levers, said legs being configured to urge said opening levers away from each other.

11. The auxiliary magnification system of claim 10, wherein said flexibly deformable arm comprises a flexible metallic gooseneck coil.

12. The auxiliary magnification system of claim 11, wherein said clamping arms are adapted to engage sidepieces of a pair of spectacles, holding said first and second body portions vertically thereabove.

13. The auxiliary magnification system of claim 12, wherein said clamping arms are adapted to engage sidepieces of a pair of spectacles, holding said first and second body portions vertically therebelow.

\* \* \* \* \*